(12) United States Patent
Yoo

(10) Patent No.: US 7,009,653 B2
(45) Date of Patent: Mar. 7, 2006

(54) PHOTOGRAPHING APPARATUS HAVING FUNCTION OF PREVENTING BLUR OF STILL IMAGE

(75) Inventor: Kyung-Soo Yoo, Suwon (KR)

(73) Assignee: Samsung Electronics, Co., Ltd., Suwon-si (KR)

( * ) Notice: Subject to any disclaimer, the term of this patent is extended or adjusted under 35 U.S.C. 154(b) by 799 days.

(21) Appl. No.: 10/046,239

(22) Filed: Jan. 16, 2002

(65) Prior Publication Data

US 2002/0196359 A1 Dec. 26, 2002

(30) Foreign Application Priority Data

Jun. 22, 2001 (KR) .............................. 2001-35923

(51) Int. Cl.
*H04N 5/238* (2006.01)

(52) U.S. Cl. .................................... 348/363
(58) Field of Classification Search ........... 348/207.99, 348/362, 363, 367, 224.1; 396/54, 472
See application file for complete search history.

(56) References Cited

U.S. PATENT DOCUMENTS

| | | | |
|---|---|---|---|
| 4,470,687 A | | 9/1984 | Saito et al. |
| 5,173,728 A | * | 12/1992 | Sangregory et al. ........ 396/454 |
| 5,245,380 A | | 9/1993 | Yang |
| 5,317,353 A | * | 5/1994 | Kobayashi et al. ......... 396/472 |
| 5,471,242 A | * | 11/1995 | Kondo .................... 348/224.1 |
| 5,517,243 A | | 5/1996 | Kudo et al. |

FOREIGN PATENT DOCUMENTS

| | | |
|---|---|---|
| JP | 08 308275 | 11/1996 |
| JP | 11 015040 | 1/1999 |
| JP | 2001 117137 | 4/2001 |

OTHER PUBLICATIONS

Communication issued by the European Patent Office on the 16th of Oct. 2001 in co-pending application Serial No. 02251359.2-1241 of the instant inventors.

* cited by examiner

*Primary Examiner*—Tuan Ho
(74) *Attorney, Agent, or Firm*—Robert E. Bushnell, Esq.

(57) ABSTRACT

The present invention discloses a photographing apparatus having the function of preventing blur of a still image. A diaphragm unit controls the amount of light incident on a photoelectric transduction unit from a lens. A diaphragm driving unit controls an open/close operation of the diaphragm unit. When opening the diaphragm unit, a control unit outputs to the diaphragm driving unit a control signal for supplying a driving voltage in a direction of opening the diaphragm unit. When closing the diaphragm unit, the control unit outputs to the diaphragm driving unit a control signal for supplying the driving voltage in a direction of closing the diaphragm unit. Moreover, power supplied to the diaphragm unit is controlled without requiring a special mechanical shutter, thereby reducing the time from an open state to a close state of a diaphragm. As a result, it is possible to prevent a blur of the image generated due to movement of a subject or shaking of the photographer's hands.

21 Claims, 9 Drawing Sheets

PHOTOGRAPHING APPARATUS HAVING FUNCTION OF PREVENTING BLUR OF STILL IMAGE

CLAIM OF PRIORITY

This application makes reference to, incorporates the same herein, and claims all benefits accruing under 35 U.S.C. §119 from my application PHOTOGRAPHING APPARATUS HAVING FUNCTION OF PREVENTING BLUR OF STILL IMAGE filed with the Korean Industrial Property Office on Jun. 22, 2001 and there duly assigned Serial No. 35923/2001.

BACKGROUND OF THE INVENTION

1. Technical Field

The present invention relates to a photographing apparatus having the function of preventing the blur of a still image and, more particularly, to a photographing apparatus which can prevent the blur of a still image in photographing the still image by embodying a mechanical shutter function with an iris meter.

2. Related Art

A digital image apparatus, such as a digital camera or camcorder, photographs an image by sensing light reflected from a subject by using a photoelectric transducer. The digital image apparatus stores the image in a memory device in the form of digital information so that the user can edit the image by means of a computer.

In photographing a still image, the digital image apparatus uses a mechanical shutter to reduce shaking of a screen due to movement of the subject or shaking of the photographer's hands.

A digital camcorder consists of a photographing unit, stepping motors and motor driving units for driving the respective elements of the photographing unit, an analog-to-digital (A/D) converter, a signal processing unit, a memory, an image chip, a pulse generation unit, and a control unit.

The photographing unit includes a zoom lens unit for adjusting the magnification of a subject incident on a photoelectric transducer, a mechanical shutter unit for preventing blur of a photographed image generated due to shaking of the photographer's hands or movement of the subject, a diaphragm unit for controlling the amount of light incident on the photoelectric transducer, a focus lens unit for controlling the focus of the image incident on the photoelectric transducer, and the photoelectric transducer for converting the incident light into an electrical signal.

The zoom lens unit, the mechanical shutter unit, the diaphragm unit and the focus lens unit are driven by respective stepping motors. The respective stepping motors are controlled by the motor driving units operated according to a control signal from a control unit.

A pulse generation unit outputs a charge extract pulse for extracting charges accumulated in the photoelectric transducer, and an erase pulse for erasing the accumulated charges. The A/D converter converts the analog signal from the photoelectric transducer into a digital signal according to a correlation dual sampling process and an auto gain control process. The signal processing unit encodes and compresses the digital signal. The image chip generates an image suitable for the photographing apparatus, such as a digital video compressor (DVC) and a digital signal compressor (DSC). The final image is stored in memory.

The control unit controls the entire operation of the above elements. In particular, the s control unit outputs a control signal to the motor control unit for controlling the operation of the stepping motor connected to the mechanical shutter unit, thereby preventing blur of the photographed image generated due to shaking of the photographer's hands or movement of the subject.

However, the size of the lens is increased to compose the mechanical shutter, and special stepping motors and motor driving units are required to increase shutter speed, which results in high production cost.

On the other hand, in order to overcome the foregoing problems, it has been suggested that the mechanical shutter unit be removed and that the close time of a diaphragm be decreased by adjusting elasticity of a spring connected to a rotor of a diaphragm motor.

SUMMARY OF THE INVENTION

Accordingly, it is an object of the present invention to provide a photographing apparatus which can prevent the blur of a still image by means of an iris meter, instead of using a special mechanical shutter.

In order to achieve the above-described object of the present invention, there is provided a photographing apparatus having the function of preventing blur of a still image, including: a photoelectric transduction unit for photoelectrical-transducing incident light from a lens; a pulse generation unit for outputting a charge extract pulse for extracting charge accumulated in the photoelectric transduction unit, and an erase pulse for erasing the accumulated charge; a diaphragm unit for controlling the amount of light incident on the photoelectric transduction unit; a diaphragm driving unit for controlling an open/close operation of the diaphragm unit; and a control unit for outputting a control signal for supplying a driving voltage to the diaphragm driving unit for the purpose of opening the diaphragm unit, for outputting a control signal for supplying the driving voltage to the diaphragm driving unit in order to close the diaphragm unit, and for controlling the operation of the photoelectric transduction unit, the pulse generation unit and the diaphragm driving unit.

According to one aspect of the present invention, the diaphragm driving unit includes: a diaphragm motor for opening/closing the diaphragm unit by imparting a rotational movement, generated by a magnetic field, to the diaphragm unit; and a diaphragm motor control unit for controlling the direction of rotation and speed of the diaphragm motor.

According to another aspect of the present invention, the diaphragm motor includes: a rotor connected to the diaphragm unit, and rotated in a forward or backward direction under the control of the diaphragm motor control unit; an elastic member having one end connected to a fixing end and the other end connected to a rotor for rotating the rotor in a direction so as to close the diaphragm unit; a driving coil for generating a magnetic field to cause rotational movement of the rotor in a direction for opening or closing the diaphragm unit; and a damping coil having a switch and a damping resistance, and preventing damping of the rotor.

According to still another aspect of the present invention, the diaphragm motor control unit includes: an input voltage terminal unit having one end for receiving a reference potential signal and another end for receiving a diaphragm control signal; and a voltage conversion unit for converting the input voltage from the input voltage terminal unit into the driving voltage of the diaphragm unit. The control unit outputs a control signal for varying the diaphragm control signal so as to form the driving voltage in the driving coil so as to close the diaphragm unit, and a control signal for opening the switch associated with the damping coil in the diaphragm motor control unit when closing the diaphragm unit.

According to still another aspect of the present invention, the diaphragm control signal is supplied until an operation of extracting the charge accumulated in the photoelectric transduction unit is completed according to the charge extract pulse from the pulse generation unit. Preferably, the varied diaphragm control signal enables an initial value of the driving voltage to be higher than a final value thereof for a predetermined time after the start time of a close operation of the diaphragm unit.

According to still another aspect of the present invention, the diaphragm motor control unit includes a switch unit for varying a voltage supplied from the voltage conversion unit to the diaphragm motor according to a short operation, and for supplying the driving voltage to the diaphragm motor to open or close the diaphragm unit. The control unit outputs a switching control signal to the switch unit, thereby outputting a control signal for supplying to the diaphragm unit the driving voltage for closing the diaphragm unit by inverting the driving voltage supplied to the diaphragm motor in opening the diaphragm unit, and outputting a control signal for opening the switch connected to the damping coil when supplying the driving voltage to close the diaphragm unit.

According to still another aspect of the present invention, the driving voltage for closing the diaphragm unit is supplied until the operation of extracting the charge accumulated in the photoelectric transduction unit is completed according to the charge extract pulse from the pulse a generation unit. Preferably, the driving voltage has an initial level higher than a final level, and is a step signal maintaining the initial level for a predetermined time.

The still image can be photographed without a blur by embodying the mechanical shutter function by using the diaphragm unit and the diaphragm driving unit. In addition, special stepping motors and motor driving units are not required to reduce the size of the lens, thereby cutting down the production cost.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF PREFERRED EMBODIMENT

Figure 1:
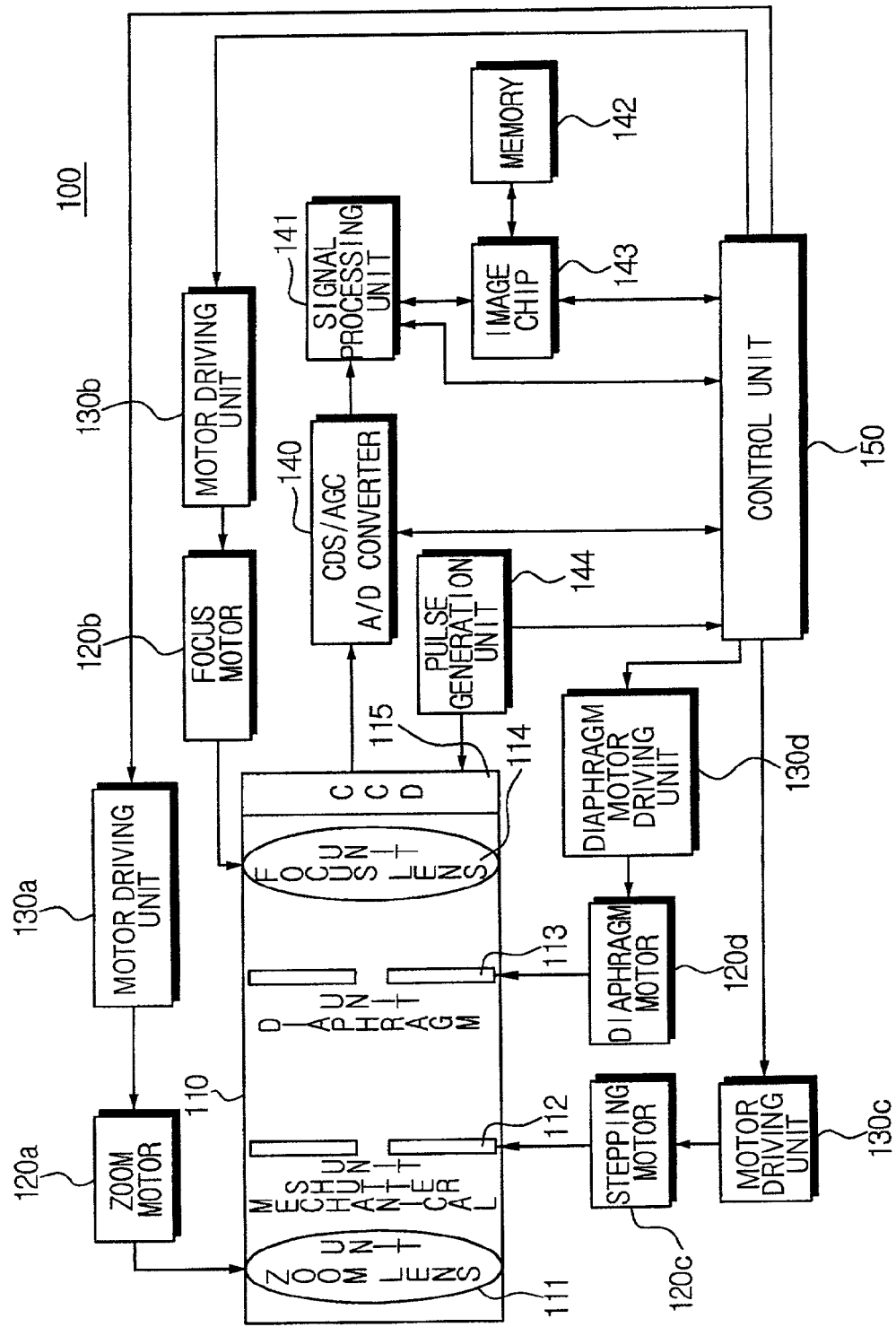
FIG. 1 is a block diagram illustrating an internal structure of a digital camcorder.

A photographing apparatus having the function of preventing the blur of a still image in accordance with preferred embodiments of the present invention will now be described in detail with reference to the accompanying drawings. In the following description, identical reference numerals are used for the same elements appearing in different drawings.

FIG. 1 is a block diagram illustrating the internal structure of a digital camcorder. Referring to FIG. 1, the digital camcorder 100 includes: a photographing unit 110; stepping motors 120a~120d; motor driving units 130a~130d for driving the respective elements of the photographing unit 110; an A/D converter 140; a signal processing unit 141; a memory 142; an image chip 143; a pulse generation unit 144; and a control unit 150.

The photographing unit 110 includes: a zoom lens unit 111 for adjusting the magnification of a subject incident on a photoelectric transducer (change-coupled device or CCD) 115; a mechanical shutter unit 112 for preventing blur of a photographed image generated due to shaking of the photographer's hands or movement of the subject; a diaphragm unit 113 for controlling the amount of light incident on the photoelectric transducer 115; a focus lens unit 114 for controlling the focus of the image incident on the photoelectric transducer 115; and the photoelectric transducer (CCD) 115 for converting the incident light into an electrical signal.

The zoom lens unit 111, the mechanical shutter unit 112, the diaphragm unit 113 and the focus lens unit 114 are driven by respective stepping motors 120a~120d. The respective stepping motors 120a~120d are controlled by the motor driving units 130a~130d operated according to a control signal from the control unit 150.

The pulse generation unit 144 outputs a charge extract pulse for extracting charge accumulated in the photoelectric transducer 115, and an erase pulse for erasing the accumulated charge. The A/D converter 140 converts the analog signal from the photoelectric transducer 115 into a digital signal according to a correlation dual sampling process and an auto gain control process. The signal processing unit 141 encodes and compresses the digital signal. The image chip 143 generates an image suitable for a photographing apparatus, such as the DVC and the DSC. The final image is stored in the memory 142.

The control unit 150 controls the entire operation of the above elements. In particular, the control unit 150 outputs a control signal to the motor driving unit 130c for controlling the operation of the stepping motor 120c connected to the mechanical shutter unit 112, thereby preventing blur of the photographed image generated due to shaking of the photographer's hands or movement of the subject.

However, the size of the lens is increased to compose the mechanical shutter, and special stepping motors and motor driving units are required to increase shutter speed, which results in high production cost.

On the other hand, in order to overcome the foregoing problems, it has been suggested that the mechanical shutter unit be removed and that the close time of the diaphragm be decreased by adjusting the elasticity of a spring connected to a rotor of the diaphragm motor 120d.

Figure 2:
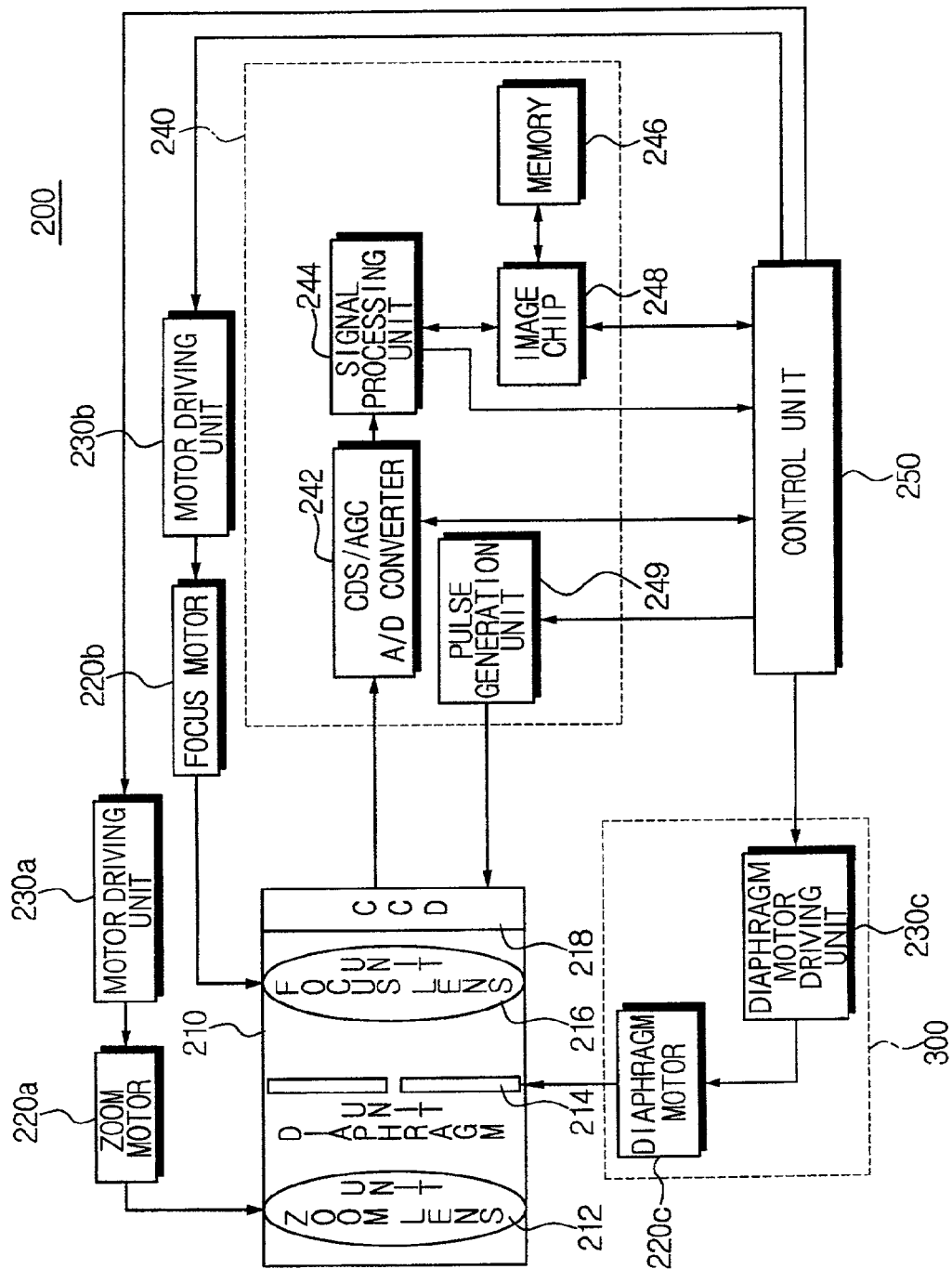
FIG. 2 is a block diagram illustrating an internal structure of a photographing apparatus having the function of preventing the blur of a still image in accordance with a first embodiment of the present invention.

FIG. 2 is a block diagram illustrating the internal structure of a photographing apparatus having the function of preventing the blur of a still image in accordance with a first embodiment of the present invention. As illustrated in FIG. 2, the photographing apparatus 200 includes: a photographing unit 210; stepping motors 220a~220c; motor driving units 230a~230c for driving the elements of the photographing unit 210; an image signal generating unit 240; and a control unit 250.

The photographing unit 210 includes a zoom lens unit 212 for adjusting magnification, a diaphragm unit 214 for controlling the amount of incident light, a focus lens unit 216 for controlling focus, and a photoelectric transduction unit (CCD) 218 for converting the incident light into an electrical signal.

The zoom lens unit 212, the diaphragm unit 214 and the focus lens unit 113 are driven by respective stepping motors 220a~220c. In addition, the respective stepping motors 220a~220c are controlled by respective motor driving units 230a~230c operated according to a control signal from the control unit 250.

The image signal generating unit 240 includes: a pulse generation unit 249 for outputting a charge extract pulse for extracting charge accumulated in the photoelectric transduction unit 218, and an erase pulse for erasing the accumulated charge; an A/D converter 242 for converting the analog signal from the photoelectric transduction unit 218 into a digital signal according to a correlation dual sampling process and an auto gain control process; a signal processing unit 244 for encoding and compressing the digital signal; an image chip 246 for generating an image suitable for a photographing apparatus such as the DVC and the DSC; and a storing unit 248 for storing a final image.

The control unit 250 controls the entire operation of the above elements. In particular, when a still image is photographed, the control unit 250 outputs a control signal for supplying a forward driving voltage to the motor driving unit 230c connected to the diaphragm unit 214 so as to open the diaphragm unit 214, and also outputs a control signal for supplying a backward driving voltage to the motor driving unit 230c connected to the diaphragm unit 214 so as to close the diaphragm unit 214.

Figure 3:
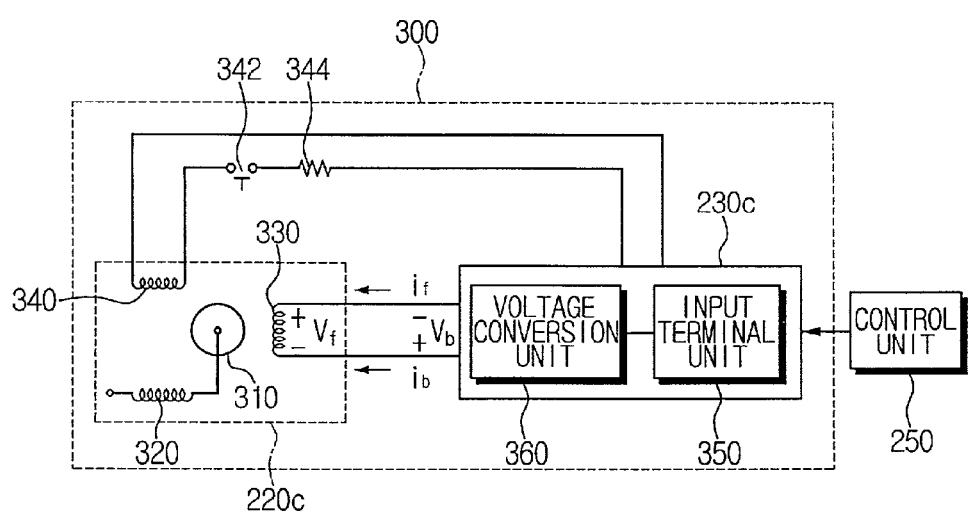
FIG. 3 is a block diagram illustrating one example of a diaphragm driving unit of the photographing apparatus in accordance with the present invention.

FIG. 3 is a block diagram illustrating one example of a diaphragm driving unit of the photographing apparatus in accordance with the present invention. Referring to FIG. 3, the diaphragm driving unit 300 includes a diaphragm motor 220c for opening/closing the diaphragm unit 214 by imparting a rotational movement generated by a magnetic field to the diaphragm unit 214, and a diaphragm motor control unit 230c for controlling a direction of rotation and speed of the diaphragm motor 220c.

The diaphragm motor 220c includes a rotor 310 connected to the diaphragm unit 214 and rotated in a direction of opening/closing the diaphragm unit 214 under the control of the diaphragm motor control unit 230c, an elastic member 320 having one end connected to a fixed point and another end connected to the rotor 310 for rotating the rotor 310 in a direction for closing the diaphragm unit 214, a driving coil 330 for generating a magnetic field to cause a rotational movement to the rotor 310 in the direction of opening or closing the diaphragm unit 214, and a damping coil 340 having a switch 342 and a damping resistance 344, and preventing damping of the rotor 310.

The diaphragm motor control unit 230c includes an input voltage terminal unit 350 having one end for receiving a reference potential signal and another end for receiving a diaphragm control signal, and a voltage conversion unit 360 for converting the input voltage from the input voltage terminal unit 350 into a driving voltage of the diaphragm driving unit 220c.

The control unit 250 outputs a control signal for varying the diaphragm control signal so as to form, in the driving coil 330, a driving voltage in a direction of closing the diaphragm unit 214, and a control signal for opening the switch 342 connected to the damping coil 340 in the diaphragm motor control unit 230c when closing the diaphragm unit 214.

Figure 4A:
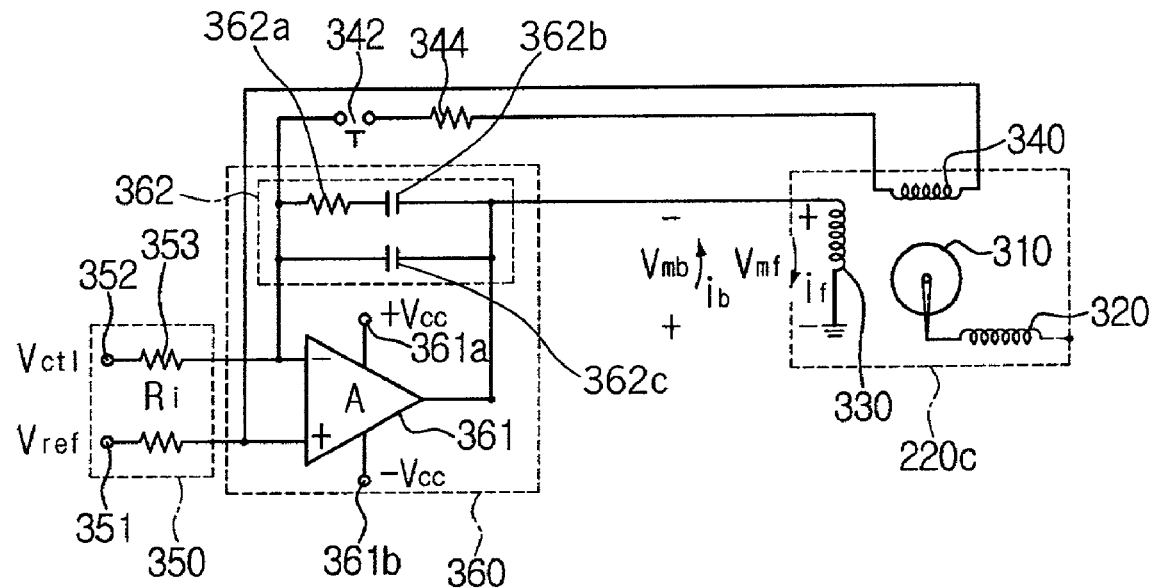
FIG. 4A is a circuit diagram illustrating one example of the diaphragm driving unit of the photographing apparatus in accordance with the present invention.

FIG. 4A is a circuit diagram illustrating one example of the diaphragm driving unit of the photographing apparatus in accordance with the present invention.

As depicted in FIG. 4A, the reference potential signal Vref is inputted to one end 351 of the input terminal unit 350, and the diaphragm control signal Vct1 is inputted to the other end 352 thereof. The end 352 receiving the diaphragm control signal Vct1 is connected to an input resistance 353.

The voltage conversion unit 360 includes an OP amp 361 and an integral circuit 362. An inversion terminal of the OP amp 361 receives the diaphragm control signal Vct1 via resistor 353, and a non-inversion terminal thereof receives the reference potential signal Vref via resistor 350. A first power terminal 361a of the OP amp 361 receives a positive driving potential+Vcc (for example, 15V), and a second power terminal 361b thereof receives a negative driving potential–Vcc (for example, –15V).

The integral circuit 362 is a negative feedback circuit for feeding back the output voltage from the OP amp 361 to the non-inversion terminal. In the integral circuit 362, a resistance 362a and a capacitor 362b connected in series are connected in parallel with a capacitor 362c. The output voltage is fed back to the input terminal by the integral circuit 362.

The output from the voltage conversion unit 360 is supplied to one end of the driving coil 330, and the other end of the driving coil 330 is grounded. The output from the voltage conversion unit 360 is controlled to supply current to driving coil 330 in a direction for opening or closing the diaphragm to the driving coil according to variations of the inputted diaphragm control signal.

One end of the damping coil 340 is connected via the switch 342 and the damping resistance 344 to the inversion terminal of the OP amp 361. The other end of the damping coil 340 is connected to the non-inversion terminal of the OP amp 361. The damping coil 340 prevents damping of the diaphragm motor 220c.

The operation of the diaphragm driving unit 300 shown in FIG. 4A will now be described in detail with reference to FIGS. 4B thru 4D.

Figure 4B:
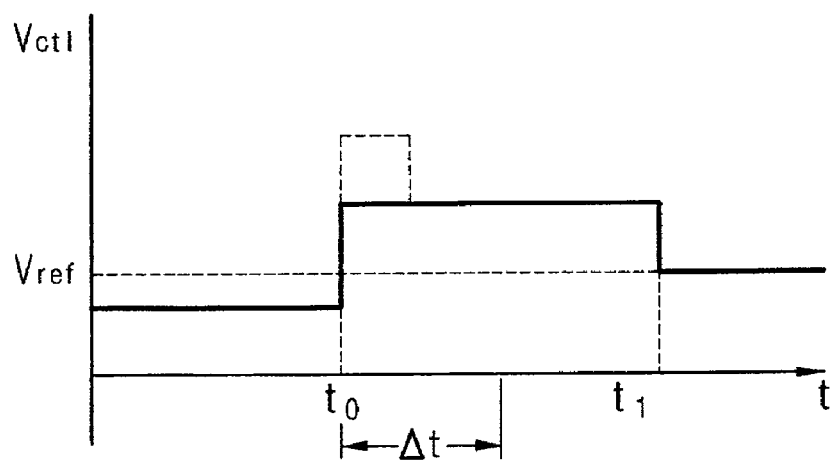
FIGS. 4B thru 4D show variations in time of a diaphragm control signal and a reference potential signal inputted to an input terminal unit, a driving voltage supplied to a driving coil, and a driving current flowing through the driving coil, respectively.
Figure 4C:
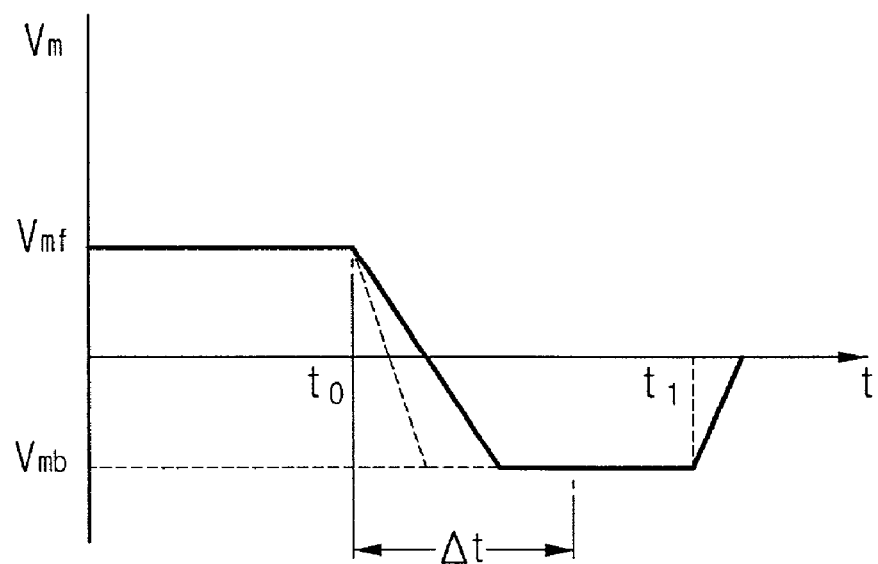
Figure 4D:
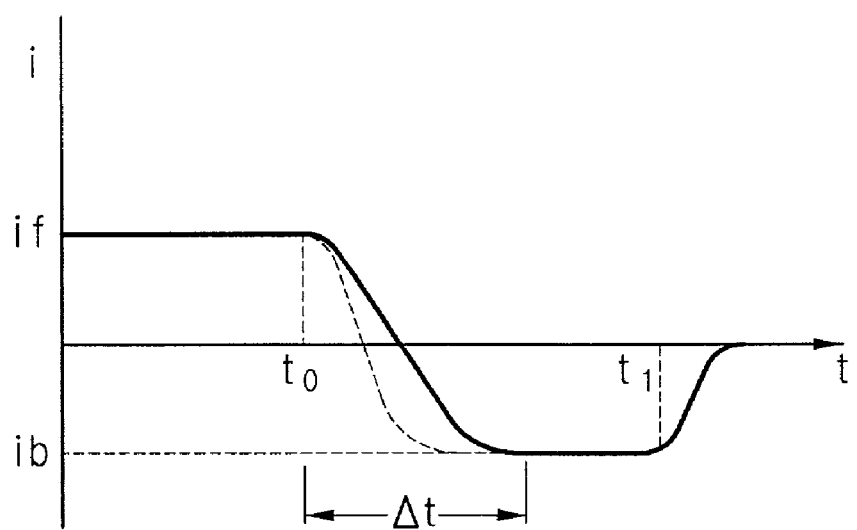

FIGS. 4B thru 4D show variations in time of the diaphragm control signal and the reference potential signal inputted to the input terminal unit 350, a driving voltage supplied to the driving coil 330, and a driving current flowing through the driving coil 330, respectively.

When the diaphragm control signal having a potential level lower than the reference potential signal is inputted to the end 352 of the input terminal unit 350, the current if flows through the driving coil 330 in a direction for opening the diaphragm unit 214. When the diaphragm control signal is varied to close the diaphragm unit 214 for a predetermined time $t_0$, the current ib flows through the driving coil 330 in an opposite direction relative to the current if. The rotor 310 is rotated in a direction for closing the diaphragm unit 214 by the current ib. The close time of the diaphragm unit 214 is shortened according to a contractive force of the spring 320.

Preferably, the switch 342 connected to the damping coil 340 via resistor 344 is opened at a time to when the diaphragm control signal is varied to close the diaphragm unit 214. Accordingly, the diaphragm unit 214 can be more rapidly closed.

The voltage applied to the driving coil 330 is completely inverted at a predetermined time after the time $t_0$. At this time, presuming that a time for completely closing the diaphragm is $\Delta t$, $\Delta t$ ranges from 5.97 ms to 6.03 ms. Preferably, the inverted voltage is supplied to the driving coil 330 until the charge accumulated in the photoelectric transduction unit 218 are completely extracted. This time is represented as $t_1$, in FIG. 4C.

FIG. 4D shows variations of the current if flowing through the driving coil in a direction for opening the diaphragm unit. A magnitude of the current if starts to be reduced at time $t_0$, and a direction of the current if is changed after a predetermined time thereafter. In FIG. 4D, ib denotes the current flowing in the opposite direction relative to the current if.

Preferably, the diaphragm control signal varied at time $t_0$ is supplied until the operation of extracting the charge accumulated in the photoelectric transduction unit 218 is finished according to the charge extract pulse from the pulse generation unit 249. Advantageously, the diaphragm control signal is varied so that an initial value of the voltage applied to the driving coil 330 is higher than a final value thereof for a predetermined time after a start time $t_0$ of the close operation of the diaphragm unit 214. In FIGS. 4B thru 4D, a waveform of the diaphragm control signal, the voltage applied to the driving coil 330, and the current flowing through the driving coil 330, respectively, are indicated by dotted lines. As a result, the time of closing the diaphragm unit 214 can be shortened.

In the above-described embodiment, variations of the diaphragm control signal and the open/close operation of the switch 342 are controlled by the control unit 250.

Figure 5A:
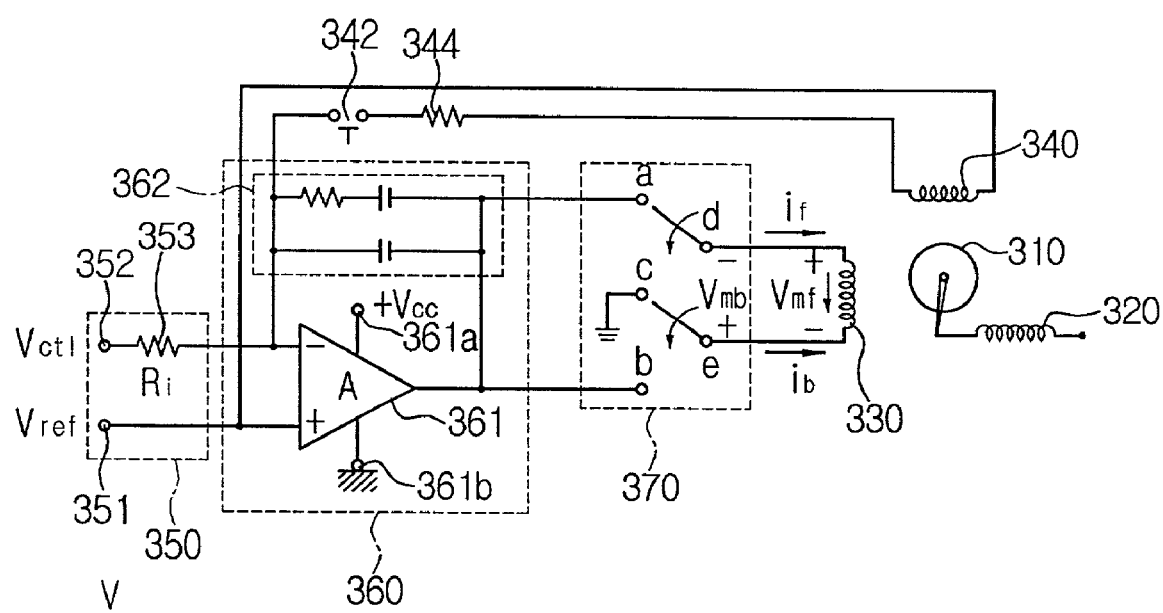
FIG. 5A is a circuit diagram illustrating another example of the diaphragm driving unit of the photographing apparatus in accordance with the present invention.

FIG. 5A is a circuit diagram illustrating another example of the diaphragm driving unit of the photographing apparatus in accordance with the present invention.

The diaphragm driving unit 230c of FIG. 5A has a constitution similar to that of the diaphragm driving unit 230c of FIG. 4A. Therefore, differences between the diaphragm driving unit of FIG. 5A and the diaphragm driving unit of FIG. 4A will now be explained in brief.

Referring to FIG. 5A, the second power terminal 361b of the OP amp 361 is grounded, and a switch unit 370 is provided between the voltage conversion unit 360 and the driving coil 330.

When the diaphragm unit 214 is opened, terminals d and e of the driving coil 330 are connected to terminals a and c, respectively, of the voltage conversion unit 360, and thus a voltage is applied to the driving coil 330 in a direction for opening the diaphragm unit 214. In this case, when a control signal for switching the switch unit 370 is inputted from the control unit 250 to the switch unit 370 at a predetermined time $t_0$, the terminals d and e of the driving coil 330 are connected to the terminals c and b, respectively, of the voltage conversion unit 360. Accordingly, a voltage is applied to the driving coil 330 in a direction for closing the diaphragm unit 214.

Figure 5B:
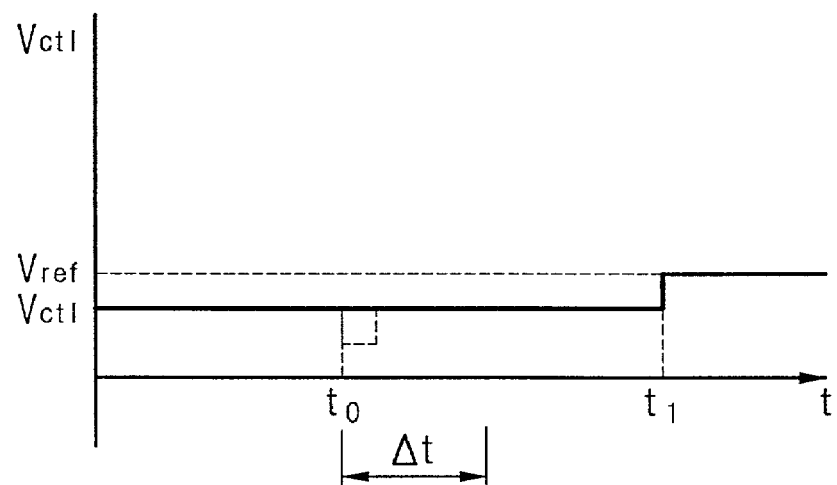
FIGS. 5B and 5C show variations of the diaphragm control signal and the reference potential signal inputted to an input terminal unit of the diaphragm driving unit of FIG. 5A, and the voltage supplied to the driving coil by time, respectively.
Figure 5C:
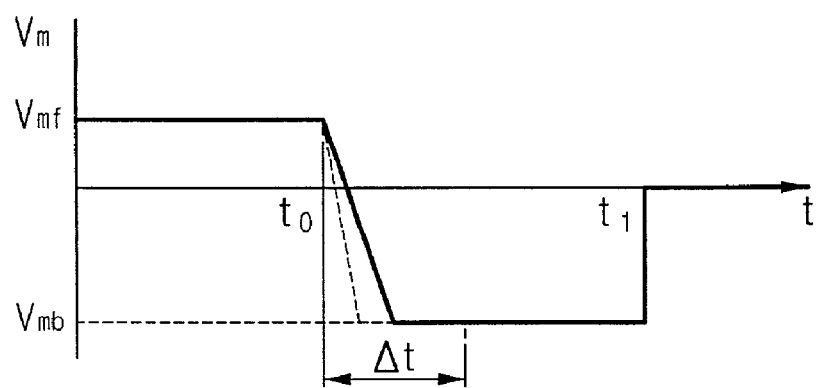

FIGS. 5B AND 5C show variations with time of the diaphragm control signal and the reference potential signal inputted to the input terminal unit of the diaphragm driving unit of FIG. 5A, and the voltage supplied to the driving coil, respectively.

In contrast to FIGS. 4B and 4C, in FIGS. 5B and 5C, although the diaphragm control signal is not varied at a predetermined time $t_0$, a voltage applied to the driving coil 330 can be varied. However, the diaphragm driving unit 230c of FIG. 5A can also shorten the time of closing of the diaphragm unit 214 by varying the diaphragm control signal at a predetermined time $t_0$. In FIGS. 5B and 5C, variations of the diaphragm control signal and variations of the voltage applied to the driving coil 330 are indicated by dotted lines.

In FIGS. 4A thru 4D and FIGS. 5B and 5C, $t_0$, $t_0$, and At denote a start time of the close operation of the diaphragm unit 214, a charge extract end time for one frame in the photoelectric transduction unit 218, and a complete close time of the diaphragm unit 214, respectively.

Figure 6:
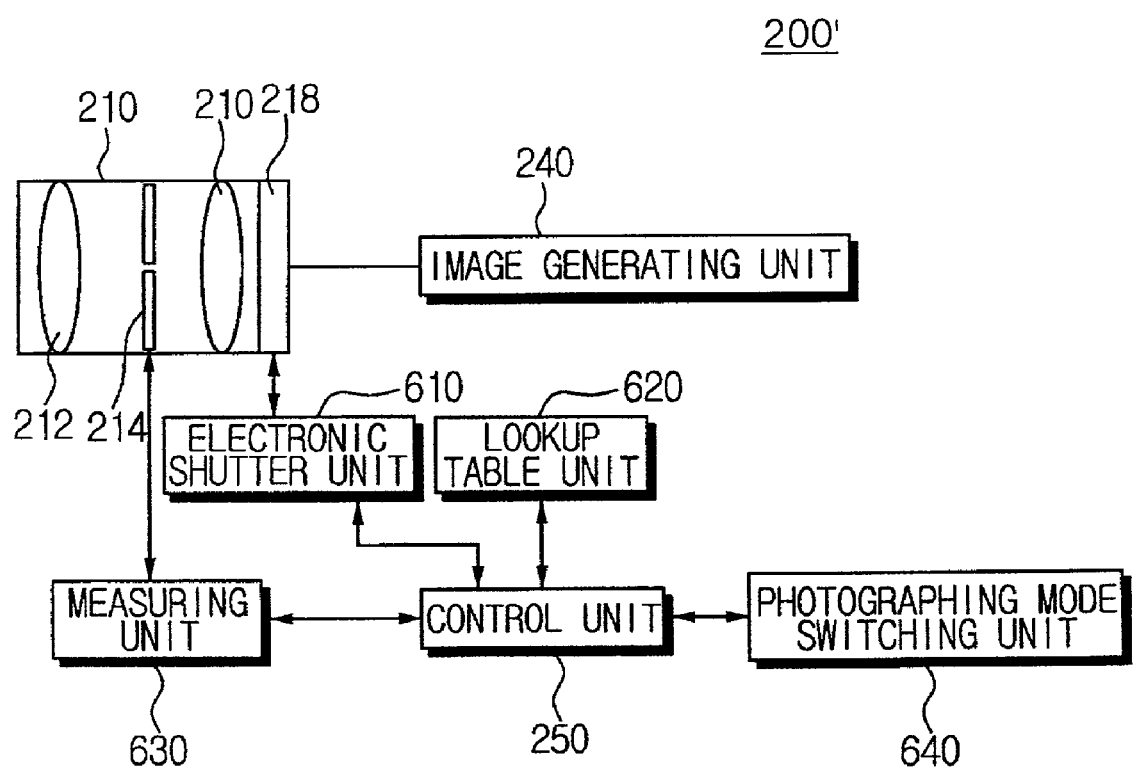
FIG. 6 is a block diagram illustrating an internal structure of a photographing apparatus having the function of preventing blur of a still image in accordance with a second embodiment of the present invention.
Figure 7:
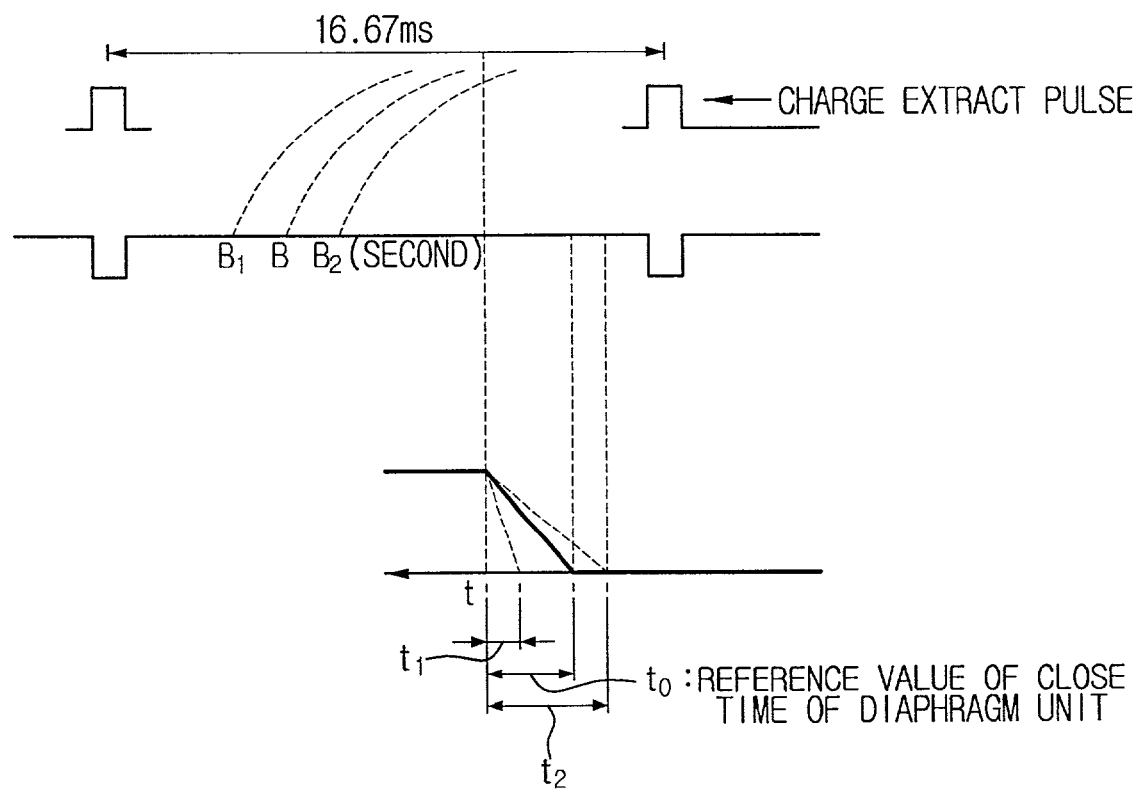
FIG. 7 shows variations of an electronic shutter speed and a close time of a diaphragm unit of the photographing apparatus of FIG. 6.

FIG. 6 is a block diagram illustrating the internal structure of a photographing apparatus having a function of preventing blur of a still image in accordance with a second embodiment of the present invention, and FIG. 7 shows variations of an electronic shutter speed and a close time of a diaphragm unit of the photographing apparatus of FIG. 6.

As illustrated in FIG. 6, the photographing apparatus 200' further includes an electronic shutter unit 610, a lookup table unit 620, and a measuring unit 630.

The electronic shutter unit 610 controls the amount of charge accumulated in the photoelectric transduction unit 218 by varying a potential barrier value of the photoelectric transduction unit 218.

The lookup table unit 620 records compensation values of electronic shutter speed corresponding to variations of the time between open and close operations of the diaphragm unit 214 on the basis of the electronic shutter speed set up for the reference time from the open to close state of the diaphragm unit 214 in order that the output of the photoelectric transduction unit 218 have an appropriate level.

The measuring unit 630 measures the time between open and close states of the diaphragm unit 214. The control unit 250 extracts a compensation value from the lookup table unit 620 according to a difference between the value measured in the measuring unit 630 and the reference time value, and outputs a control signal for adjusting the electronic shutter speed of the electronic shutter unit 610.

The control unit 250 outputs, to the electronic shutter unit 610, a control signal for varying the electronic shutter speed by as much as the compensation value stored in the lookup table unit 620 according to the difference between the close time measured in the measuring unit 630 and the reference close time.

As depicted in FIG. 7, $t_0$ denotes the reference time between open and close states of the diaphragm unit 214. The control unit 250 of the photographing apparatus 200 sets up the electronic shutter speed (for example, $$\frac{1}{100}$$

second) in order that the output of the photoelectric transduction unit 218 have a proper level according to the reference time $t_0$. However, the actual time between the open and close states of the diaphragm unit 214 may be different from the reference time to. That is, the diaphragm unit 214 may be more rapidly or more lately closed than the reference time indicated by $t_1$, and $t_2$ in FIG. 7.

When the diaphragm unit 214 is closed in the time interval $t_1$ and earlier than the reference time $t_0$, the amount of the charge accumulated in the photoelectric transduction unit 218 does not reach an appropriate level. This is because the amount of light incident on the photoelectric transduction unit 218 varies according to the lens or brightness of the subject.

When the reference time for closing the diaphragm unit 214 is $t_0$ and the electronic shutter speed set up for a currently-photographed field is B seconds, if the close time of the diaphragm unit 214 measured in the measuring unit 630 is $t_1$, the control unit 250 searches in the lookup table unit 620 to extract a compensation value corresponding to a difference between the reference time $t_0$ and the measured time $t_1$.

The control unit 250 outputs a control signal to the electronic shutter unit 610 so as to vary the electronic shutter speed to $B_1$, which is an electronic shutter speed for increasing the amount of charge accumulated in the photoelectric transduction unit 218 according to the compensation value. On the other hand, when the close time of the diaphragm unit 214 is $t_2$, the varied electronic shutter speed is $B_2$.

The photographing apparatus having the function of preventing the blur of a still image in accordance with the present invention was described above in detail with reference to the accompanying drawings. Exemplary photographing apparatuses include a variety of photographing apparatuses, such as a digital camera, a digital camcorder and a computer camera. In the case of the photographing apparatus having a motion picture photographing function as a main function, such as the digital camcorder, in photographing a motion picture, a voltage supplied to the driving coil 330 for opening the diaphragm unit 214 is not inverted in closing the diaphragm unit 214. Preferably, the voltage is inverted merely in photographing a still image.

In this case, the photographing apparatus 200 further includes a photographing mode switching unit 640 (FIG. 6) for switching between a still image mode and a motion picture mode. As long as the photographing mode switching unit 640 is set up in the still image mode, when closing the diaphragm unit 214, the control unit 250 outputs, to the diaphragm driving unit 300, a control signal for inverting the voltage supplied to the driving coil 330 in opening the diaphragm unit 214.

In accordance with the present invention, when photographing a still image, power is supplied to the diaphragm motor in a direction for closing the diaphragm in order to reduce the time for closing the diaphragm, thereby preventing the blur of the still image due to movement of the subject or shaking of the photographer's hands.

Moreover, a special mechanical shutter is not required by varying the direction of the power supplied to the diaphragm motor, thereby reducing the size of the lens unit and cutting down the production cost. In addition, the image can be clearly photographed by varying the electronic shutter speed according to the close time of the diaphragm.

Although the preferred embodiments of the present invention have been described, it will be understood by those skilled in the art that the present invention should not be limited to the described preferred embodiment. Rather, various changes and modifications can be made within the spirit and scope of the present invention, as defined by the following claims.

What is claimed is:

1. A photographing apparatus having a function of preventing a blur of a still image, the apparatus comprising:
    a photoelectric transduction unit for photoelectrical-transducing incident light from a lens;
    a pulse generation unit for outputting a charge extract pulse for extracting charge accumulated in the photoelectric transduction unit, and an erase pulse for erasing the accumulated charge;
    a diaphragm unit for controlling an amount of light incident on the photoelectric transduction unit;
    a diaphragm driving unit for controlling an open/close operation of the diaphragm unit; and
    a control unit for outputting, to the diaphragm driving unit, a first control signal to supply a driving voltage in a direction of opening the diaphragm unit, for outputting, to the diaphragm driving unit, a second control signal to supply the driving voltage in a direction of closing the diaphragm unit, and for controlling the operation of the photoelectric transduction unit, the pulse generation unit, and the diaphragm driving unit;
    wherein the diaphragm driving unit comprises:
        a diaphragm motor for opening and closing the diaphragm unit by imparting a rotational movement generated by a magnetic field to the diaphragm unit; and
        a diaphragm motor driving unit for controlling a direction of rotation and a speed of the diaphragm motor; and
    wherein the diaphragm motor comprises:
        a rotor connected to the diaphragm unit, and rotated in at least one of a forward direction and a backward direction under control of the diaphragm motor driving unit;
        an elastic member having one end connected to a fixed point and another end connected to the rotor for rotating the rotor in a direction for closing the diaphragm unit;
        a driving coil for generating a magnetic field to cause a rotational movement of the rotor in at least one of a direction for opening and a direction for closing the diaphragm unit; and
        damping means for preventing damping of the rotor.

2. The apparatus according to claim 1, wherein the damping means includes a damping coil, a switch connected to said damping coil, and a damping resistance connected to said switch.

3. The apparatus according to claim 3, wherein the diaphragm motor driving unit comprises:
    an input voltage terminal unit having one end for receiving a reference potential signal and another end for receiving a diaphragm control signal; and
    a voltage conversion unit for converting an input voltage from the input voltage terminal unit into a driving voltage of the diaphragm motor;
    wherein the control unit outputs the first control signal for varying the diaphragm control signal to form the driving voltage in the driving coil in a direction for closing the diaphragm unit, and outputs the second control signal for opening the switch of the damping means when closing the diaphragm unit.

4. The apparatus according to claim 3, wherein the varied diaphragm control signal is supplied until the operation of extracting the charge accumulated in the photoelectric transduction unit is completed according to the charge extract pulse from the pulse generation unit.

5. The apparatus according to claim 3, wherein the varied diaphragm control signal causes an initial value of the driving voltage to be higher than a final value of the driving voltage for a predetermined period of time after a start time of the close operation of the diaphragm unit.

6. The apparatus according to claim 2, wherein the diaphragm motor driving unit comprises:
   an input voltage terminal unit having one end for receiving a reference potential signal and another end for receiving a diaphragm control signal;
   a voltage conversion unit for converting an input voltage from the input voltage terminal unit into a driving voltage of the diaphragm motor; and
   a switch unit for varying a voltage supplied from the voltage conversion unit to the diaphragm motor according to a short operation, and for supplying the driving voltage to the diaphragm motor to alternately open and close the diaphragm unit;
   wherein the control unit outputs a switching control signal to the switch unit, thereby outputting a control signal for supplying, to the diaphragm unit, the driving voltage for closing the diaphragm unit by inverting the driving voltage supplied to the diaphragm motor in opening the diaphragm unit when closing the diaphragm unit, and for outputting a control signal for opening the switch connected to the damping coil when supplying the driving voltage to close the diaphragm unit.

7. The apparatus according to claim 6, wherein the driving voltage for closing the diaphragm unit is supplied until the operation of extracting the charge accumulated in the photoelectric transduction unit is completed according to the charge extract pulse from the pulse generation unit.

8. The apparatus according to claim 7, wherein the driving voltage has an initial value higher than a final value, and is a step signal which maintains the initial value for a predetermined period of time.

9. A photographing apparatus having a function of preventing a blur of a still image, the apparatus comprising:
   a photoelectric transduction unit for photoelectrical-transducing incident light from a lens;
   a pulse generation unit for outputting a charge extract pulse for extracting charge accumulated in the photoelectric transduction unit, and an erase pulse for erasing the accumulated charge;
   a diaphragm unit for controlling an amount of light incident on the photoelectric transduction unit;
   a diaphragm driving unit for controlling an oven/close operation of the diaphragm unit;
   a control unit for outputting, to the diaphragm driving unit, a first control signal to supply a driving voltage in a direction of opening the diaphragm unit, for outputting, to the diaphragm driving unit, a second control signal to supply the driving voltage in a direction of closing the diaphragm unit, and for controlling the operation of the photoelectric transduction unit, the pulse generation unit, and the diaphragm driving unit; and a photographing mode switching unit for switching between a still image mode and a motion picture mode, wherein the control unit outputs a control signal for supplying the driving voltage for closing the diaphragm unit when the photographing mode switching unit is switched to the still image mode.

10. A photographing apparatus having a function of preventing a blur of a still image, the apparatus comprising:
    a photoelectric transduction unit for photoelectrical-transducing incident light from a lens;
    a pulse generation unit for outputting a charge extract pulse for extracting charge accumulated in the photoelectric transduction unit, and an erase pulse for erasing the accumulated charge;
    a diaphragm unit for controlling an amount of light incident on the photoelectric transduction unit;
    a diaphragm driving unit for controlling an open/close operation of the diaphragm unit;
    a control unit for outputting, to the diaphragm driving unit, a first control signal to supply a driving voltage in a direction of opening the diaphragm unit, for outputting, to the diaphragm driving unit, a second control signal to supply the driving voltage in a direction of closing the diaphragm unit, and for controlling the operation of the photoelectric transduction unit, the pulse generation unit, and the diaphragm driving unit;
    an electronic shutter unit for controlling an amount of the charge accumulated in the photoelectric transduction unit by varying a potential barrier value of the photoelectric transduction unit;
    a lookup table unit for recording compensation values of an electronic shutter speed corresponding to variations of the close time of the diaphragm unit on the basis of the electronic shutter speed set up for a reference close time from an open state to a close state of the diaphragm unit; and
    a measuring unit for measuring the close time of the diaphragm unit, wherein the control unit outputs to the electronic shutter unit a control signal for varying the electronic shutter speed by as much as the compensation value recorded in the lookup table unit according to a difference between the close time measured in the measuring unit and the reference close time.

11. The apparatus according to claim 10, wherein the diaphragm driving unit comprises:
    a diaphragm motor for opening and closing the diaphragm unit by imparting a rotational movement generated by a magnetic field to the diaphragm unit; and
    a diaphragm motor driving unit for controlling a direction of rotation and a speed of the diaphragm motor.

12. The apparatus according to claim 11, wherein the diaphragm motor comprises:
    a rotor connected to the diaphragm unit, and rotated in at least one of a forward direction and a backward direction under control of the diaphragm motor driving unit;
    an elastic member having one end connected to a fixed point and another end connected to the rotor for rotating the rotor in a direction for closing the diaphragm unit;
    a driving coil for generating a magnetic field to cause a rotational movement of the rotor in at least one of a direction for opening and a direction for closing the diaphragm unit; and
    damping means, including a damping coil, a switch connected to said damping coil, and a damping resistance connected to said switch, for preventing damping of the rotor.

13. The apparatus according to claim 11, wherein the diaphragm motor driving unit comprises:
- an input voltage terminal unit having one end for receiving a reference potential signal and another end for receiving a diaphragm control signal; and
- a voltage conversion unit for converting an input voltage from the input voltage terminal unit into a driving voltage of the diaphragm motor;
- wherein the control unit outputs the first control signal for varying the diaphragm control signal to form the driving voltage in the driving coil in a direction for closing the diaphragm unit, and outputs the second control signal for opening the switch of the damping means when closing the diaphragm unit.

14. The apparatus according to claim 13, wherein the varied diaphragm control signal is supplied until the operation of extracting the charge accumulated in the photoelectric transduction unit is completed according to the charge extract pulse from the pulse generation unit.

15. The apparatus according to claim 13, wherein the varied diaphragm control signal causes an initial value of the driving voltage to be higher than a final value of the driving voltage for a predetermined period of time after a start time of the close operation of the diaphragm unit.

16. A photographing apparatus having a function of preventing a blur of a still image, the apparatus comprising:
- a photoelectric transduction unit for photoelectrical-transducing incident light from a lens;
- a pulse generation unit for outputting a charge extract pulse for extracting charge accumulated in the photoelectric transduction unit, and an erase pulse for erasing the accumulated charge;
- a diaphragm unit for controlling an amount of light incident on the photoelectric transduction unit;
- a diaphragm driving unit for controlling an open/close operation of the diaphragm unit; and
- a control unit for outputting, to the diaphragm driving unit, a first control signal to supply a driving voltage in a direction of opening the diaphragm unit, for outputting, to the diaphragm driving unit, a second control signal to supply the driving voltage in a direction of closing the diaphragm unit, and for controlling the operation of the photoelectric transduction unit, the pulse generation unit, and the diaphragm driving unit;
- wherein the diaphragm motor driving unit comprises:
  - an input voltage terminal unit having one end for receiving a reference potential signal and another end for receiving a diaphragm control signal;
  - a voltage conversion unit for converting the input voltage from the input voltage terminal unit into a driving voltage of the diaphragm unit; and
  - a switch unit for varying a voltage supplied from the voltage conversion unit to the diaphragm motor according to a short operation, and for supplying the driving voltage to the diaphragm motor to alternately open and close the diaphragm unit;
- wherein the control unit outputs a switching control signal to the switch unit, thereby outputting a control signal for supplying to the diaphragm driving unit the driving voltage for closing the diaphragm unit by inverting the driving voltage supplied to the diaphragm motor in opening the diaphragm unit, and for outputting a control signal for opening the switch connected to the damping coil when supplying the driving voltage to close the diaphragm unit.

17. The apparatus according to claim 16, wherein the driving voltage for closing the diaphragm unit is supplied until the operation of extracting the charge accumulated in the photoelectric transduction unit is completed according to the charge extract pulse from the pulse generation unit.

18. The apparatus according to claim 17, wherein the driving voltage has an initial value higher than a final value, and is a step signal which maintains the initial value for a predetermined period of time.

19. A photographing apparatus having a function of preventing a blur of a still image, the apparatus comprising:
- a photoelectric transduction unit for photoelectrical-transducing incident light from a lens;
- a pulse generation unit for outputting a charge extract pulse for extracting charge accumulated in the photoelectric transduction unit, and an erase pulse for erasing the accumulated charge;
- a diaphragm unit for controlling an amount of light incident on the photoelectric transduction unit;
- a diaphragm driving unit for controlling an open/close operation of the diaphragm unit; and
- a control unit for outputting, to the diaphragm driving unit, a first control signal to supply a driving voltage in a direction of opening the diaphragm unit, for outputting, to the diaphragm driving unit, a second control signal to supply the driving voltage in a direction of closing the diaphragm unit, and for controlling the operation of the photoelectric transduction unit, the pulse generation unit, and the diaphragm driving unit;
- wherein the diaphragm driving unit comprises:
  - a diaphragm motor for opening and closing the diaphragm unit by imparting a rotational movement generated by a magnetic field to the diaphragm unit said diaphragm motor comprising damping means having an electrical connection to prevent damping of said diaphragm motor; and
  - a diaphragm motor driving unit for controlling a direction of rotation and a speed of the diaphragm motor;
- wherein the a diaphragm motor driving unit comprises:
  - an input voltage terminal unit having one end for receiving a reference potential signal and another end for receiving a diaphragm control signal; and
  - a voltage conversion unit for converting an input voltage from the input voltage terminal unit into a driving voltage of the diaphragm motor; and
- wherein the control unit outputs the first control signal for varying the diaphragm control signal to form the driving voltage in the driving coil in a direction for closing the diaphragm unit, and outputs the second control signal for opening a switch and interrupting said electrical connection of the damping means when closing the diaphragm unit.

20. The apparatus according to claim 19, wherein the varied diaphragm control signal is supplied until the operation of extracting the charge accumulated in the photoelectric transduction unit is completed according to the charge extract pulse from the pulse generation unit.

21. The apparatus according to claim 19, wherein the varied diaphragm control signal causes an initial value of the driving voltage to be higher than a final value of the driving voltage for a predetermined period of time after a start time of the close operation of the diaphragm unit.

* * * * *